March 30, 1943. W. DE BACK 2,314,871
APPARATUS FOR TREATING FOODSTUFFS
Filed Aug. 12, 1939 3 Sheets-Sheet 1
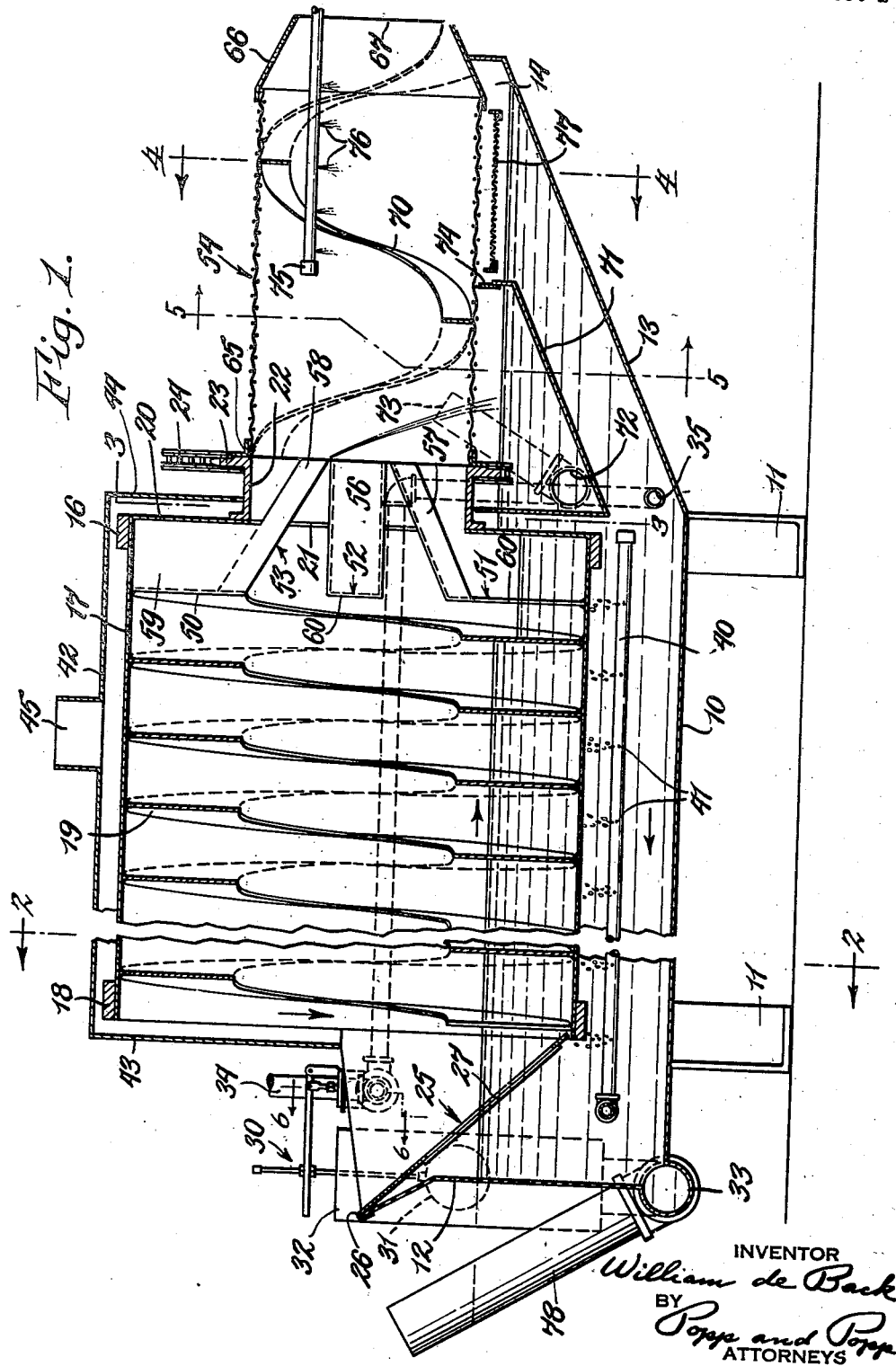
INVENTOR
William de Back
BY
Popps and Popps
ATTORNEYS March 30, 1943. W. DE BACK 2,314,871
APPARATUS FOR TREATING FOODSTUFFS
Filed Aug. 12, 1939 3 Sheets-Sheet 2
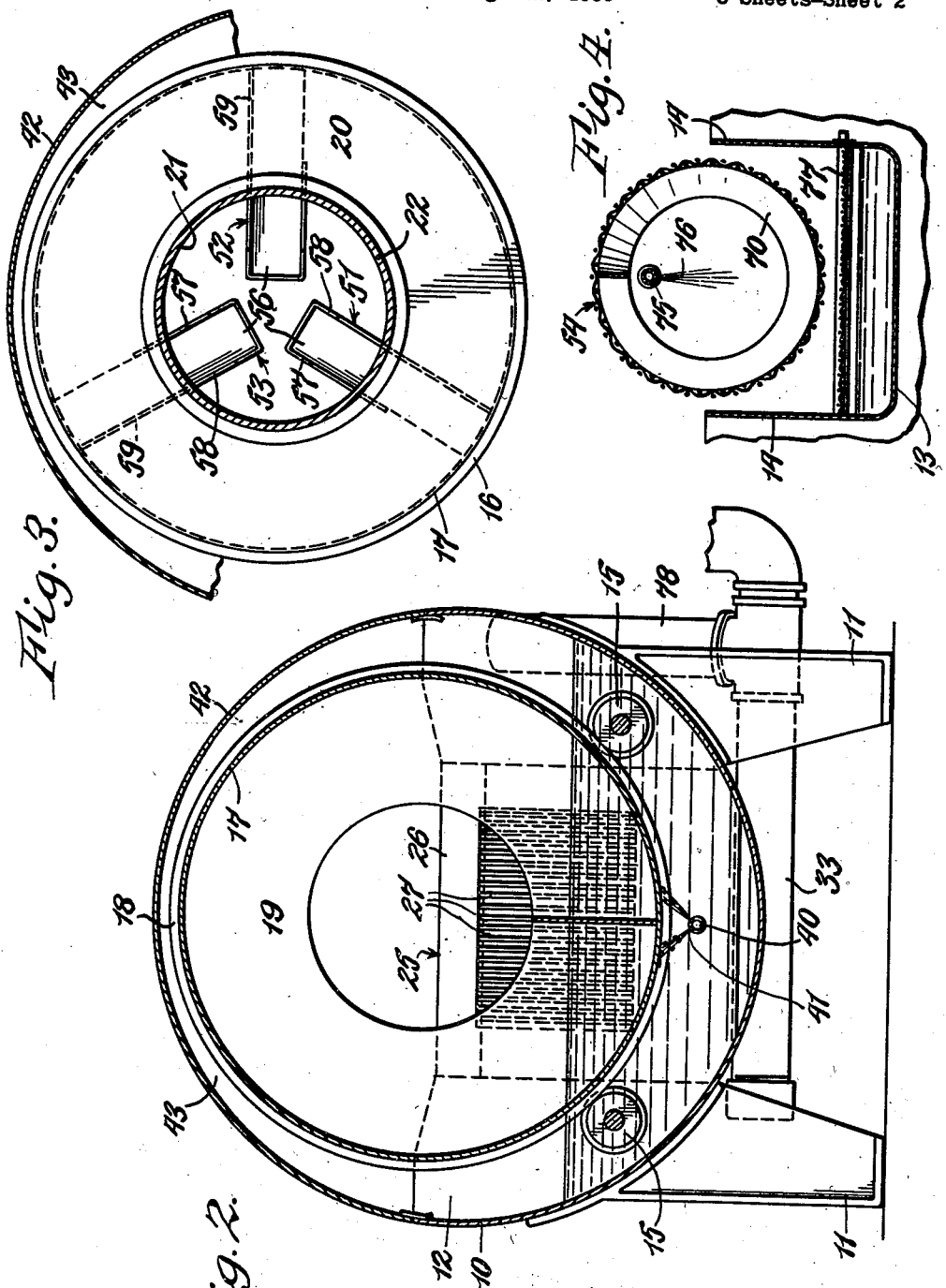
INVENTOR
William de Back
BY
Popp and Popp
ATTORNEYS March 30, 1943.　　　　W. DE BACK　　　　2,314,871
APPARATUS FOR TREATING FOODSTUFFS
Filed Aug. 12, 1939　　　　3 Sheets-Sheet 3
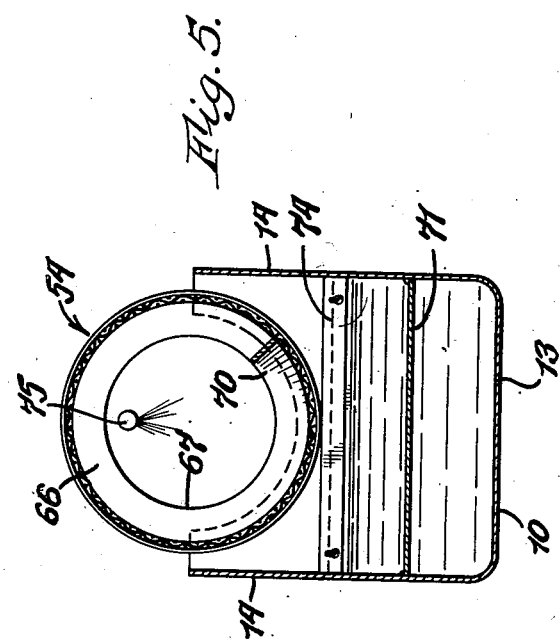
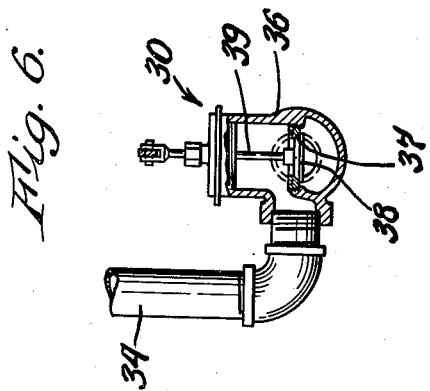
INVENTOR
William de Back
BY
Popp and Popp
ATTORNEYS Patented Mar. 30, 1943

2,314,871

UNITED STATES PATENT OFFICE 2,314,871

APPARATUS FOR TREATING FOODSTUFFS

William de Back, Niagara Falls, N. Y., assignor to Chisholm-Ryder Company, Incorporated, Niagara Falls, N. Y., a corporation of New York Application August 12, 1939, Serial No. 289,858

5 Claims. (Cl. 146—194)

This invention relates to apparatus for treating foodstuffs, such as vegetables, and more particularly to such an apparatus in which the foodstuffs to be blanched or treated are passed in small individual batches, together with enough liquid to cover the materials, in succession, through a heated chamber, following which the batches are drained and can be rinsed.

One of the objects of the invention is to provide such apparatus which is so constructed that the material to be treated is positively controlled in its course through the apparatus so as to provide a definite time of treatment and operating conditions. This is effected by dividing the materials to be treated into batches and conveying these batches, together with enough covering water, or other suitable treating liquid, positively through the treating chamber.

Another object of the invention is to provide such apparatus for blanching materials in which any desired quantity of the blanching water can be reused, it having been found, as with peas, that a lighter color and improved flavor can be obtained by using substantially fresh water for blanching, the apparatus, by adjusting the amount, if any, of water reused, permitting the blancher to be adapted to the particular material being handled and to the condition of blanching desired.

Another purpose of the invention is to provide such a batch blancher in which the batch conveyer and blanching chamber is in the form of a drum having as the conveyer an internal helix which is of sufficient depth to permit the drum to convey both the blanching water and the material to be blanched through the apparatus in separate, successive batches positively to the discharge end of the drum, the drum being heated.

Another object of the invention is to provide such a drum conveyer for separating the materials to be blanched into batches and conveying them in succession through the blanching zone in which the drum and helix are maintained in a clean and sanitary condition.

Another object of the invention is to provide such an apparatus for blanching materials in which the blanching water is positively circulated because of the pumping action of the blanching drum and in which all possibility of contamination can be avoided by using fresh water for blanching.

Another aim of the invention is to provide such a blancher in which the water required for blanching need only be provided in an amount necessary to cover the materials to be blanched, this effecting an economy in the use of water and heat.

Another purpose of the invention is to provide such an apparatus for blanching materials in which the batches of blanched materials are gently discharged in still smaller batches onto a draining screen so as to avoid injury to tender materials, and in which the water so drained is separately trapped so that any desired proportion of such used water can be wasted.

Another object of the invention is to provide such an apparatus for blanching materials in which the screened blanched materials can be rinsed or washed and in which the wash water can be subsequently used in the blanching process, the wash water for this purpose being passed through a removable screen so as to remove any debris washed from the blanched vegetables. Such rinsing of the blanched materials serves to remove any foam or other foreign material and at the same time cools the blanched materials, this in turn heating the wash water so as to effect an economy in operation.

Another object of the invention is to provide a rotary drum blancher having a rotary screen for draining and washing the blanched materials, this permitting the blancher and screen to be made and rotated as a unitary structure.

Another purpose of the invention is to provide such an apparatus for blanching material in which the imperforate rotary blanching drum is partially submerged in the water to be used for blanching and in which steam is supplied through a pipe submerged in this water and arranged under the imperforate blanching drum. This provides a simple means for both heating the blanching drum and preheating the water used for blanching and insures the blanching water being heated to a uniform temperature by agitation. Further, a positive recirculation of the blanching water is insured where a part of this water is reused and this arrangement also permits the additions of fresh as well as rinse water to be made before the water traverses the steam pipes.

Another purpose of the invention is to provide such a blancher in which the necessary additions of fresh water are made under a simple float valve control, the maintaining of an accurate level also serving to insure the addition of water to the batches of materials in an amount only necessary to cover the materials.

Another object of the invention is to provide such a blancher which is thoroughly hooded so that steam cannot escape except through the proper vents and in which the apparatus is also hooded to prevent splashing.

Another object of the invention is to provide such a blancher which is accessible throughout for the purpose of cleaning.

Another purpose of the invention is to provide such a blancher which is simple and inexpensive in construction and will not get out of order under conditions of severe and constant use and which operates continuously and with high capacity to blanch any type of materials.

In the accompanying drawings:

Fig. 1 is a vertical longitudinal section of a rotary blancher embodying my invention.

Figs. 2, 3 and 4 are vertical transverse sections, taken on the correspondingly numbered lines of Fig. 1.

Fig. 5 is a vertical section, taken on line 5—5, Fig. 4.

Fig. 6 is an enlarged transverse section through the float controlled valve which controls the admission of water or other suitable treating liquid, this section being taken on line 6—6, Fig. 1.

The blancher includes a water tank 10 which is shown as being semicylindrical in cross section and is suitably supported on legs 11. At one end this tank is provided with an end head 12 and at its opposite end is provided with an extension having an inclined lower wall 13 and side walls 14. The tank 10 carries four drum supporting rollers 15, one pair of these rollers being located at the front end of the tank and rotatably supporting a metal tire or ring 16 of a cylindrical horizontal imperforate drum 17 and the other pair of rollers 15 supporting a similar ring or tire 18 secured to the rear end of the drum 17. The drum 17 provides the blanching or treating chamber and is internally provided with a helical strip 19, this strip forming a screw for positively conducting materials from the inlet end of the drum 17 to the outlet end in separate batches. The outer edge of the helix 19 is preferably welded to the interior of the imperforate drum 17 and is of sufficient depth to permit the drum to convey both the blanching water and the materials to be blanched positively and in separate batches to the discharge end of the drum. The inner diameter of this strip is preferably large enough to permit a person to enter the drum 17 for the purpose of cleaning the screw conveyer or repairing the same.

At its discharge end the drum 17 is provided with a circular end head 20 which has a coaxial opening 21 through which the blanched materials are discharged. To the end head 20 is secured a circular concentric casting 22 which forms a discharge neck and is also formed to provide a sprocket 23, this sprocket being driven by a drive chain 24 from any suitable source of power (not shown). It will therefore be seen that as the sprocket 23 is turned by the drive chain 24 the drum 17 is rotated and the materials fed to the leading end of the screw 19 will be separated into individual batches, these batches being moved in succession lengthwise of the drum 17.

The materials so supplied to the inlet end of the drum 17 comprise the vegetables to be blanched and sufficient preheated water to cover the vegetable, any desired proportion of which can be fresh water. To supply the vegetables a bar screen 25 is removably mounted in any suitable manner on the end head 12 of the tank 10, this bar screen comprising an inclined frame 26 which is formed to hook over the end head 12 and supported by the tank 10 at its lower end to discharge into the open end of the drum 17. The frame 26 carries a plurality of bars 27 which insure the delivery of the materials to be blanched to the lead end of the screw 19 and also permits blanching water to flow from the tank 10 to the lead end of this screw so as to provide the amount of water necessary to cover the batches of materials separated by the screw 19 and conducted lengthwise of the imperforate drum 17.

The water admitted to the tank 10 is under control of a float valve 30, the float 31 of which is preferably arranged in a tank 32 which is connected with the main tank 10 by a duct 33. The float 31 is therefore responsive to the level of the water in the tank 10 and operates to control the admission of fresh water from a pipe 34 to a water inlet 35 in the extension 13, 14 of the tank 10. The float valve 30 can be adjusted to maintain any desired level in the tank 10 and hence in the drum 17, the drum 17 being submerged in this water to an extent sufficient to provide water in the batches picked up by the screw 19.

The valve part of the float valve can be of any suitable construction to cut off the flow of water through the inlet 35 in response to the rising movement of the float 31 induced by the level of the liquid in the tank 10 rising to the level which the float valve is set to maintain. As best shown in Fig. 6, this float valve 30 is shown as comprising a body 36 having a central partition which carries a downwardly facing valve seat 37 and forming an upper inlet chamber which connects with the supply pipe 34 and a lower outlet chamber which connects with the pipe leading to the water inlet 35 of the tank 10. A valve head 38 is arranged in the lower chamber to seat upwardly against the seat 37. This valve head 38 is secured to the lower end of a valve rod 39 which extends upwardly through the usual stuffing box or gland provided in the cap for the valve body and connects with the horizontal arm of the float valve. It will be seen that as the float 31 and its arm rises, the valve rod 39 is lifted to draw the valve head 38 upwardly into engagement with its valve seat 37. This cuts off the admission of water through the inlet 35 of the tank 10. When the liquid in the tank 10 becomes depleted, the lowering level of this liquid causes the float 31 and its arm to drop thereby lowering the valve rod 39 to move the valve head 38 downwardly away from its valve seat. This permits make-up water to flow through the valve 30 from the supply pipe 34 into the inlet 35 of the tank 10 and thereby restore the proper level of liquid in this tank.

Heat for blanching the materials conveyed in separate batches by the screw 19 is supplied by a steam pipe 40 arranged longitudinally under the center of the drum 17 and having a plurality of openings 41 in its upper part through which steam is discharged, this steam preheating the blanching water flowing through the tank 10 toward its left hand end as viewed in Fig. 1 and also rising to heat the drum 17 and hence the batches of materials being conveyed therethrough. The addition of fresh water through the inlet 35 is made in the extension 13, 14 of the tank 10 and it will therefore be seen that this water must be preheated by the steam pipe 40 before being mixed with the material to be blanched. Further, it will be seen that the rotation of the drum, the movement of the water through the tank 10 toward the inlet end of this drum and the agitation provided by the steam issuing through the ports 41, serves to maintain a uniform water temperature at the lead end of the screw 19.

The blanching drum 17 and tank 10 is hooded to prevent the escape of steam except through the proper vents. For this purpose a semicircular hood 42 is provided, the lower edges of which rest on the upper edges of the semicircular tank 10, as best shown in Fig. 2, and this hood being provided with an end head 43 across the inlet end of the drum 17 and an end head 44 at the other end of the drum 17. This hood is provided with a vent 45 through which the vapor escapes.

The trailing end 50 of the screw 19 terminates short of the circular end head 20 of the drum and three buckets 51, 52 and 53 are provided for lifting the blanched materials and water from the space between the screw and the end head 20 and discharging them through the neck 22 into a rotary screen 54. For this purpose each of the discharge buckets comprises a chute having an inner plate 56 and side walls 57 and 58, the chutes inclining toward one another toward the discharge opening in the casting 22 and the wall 58 of each chute being extended radially outward, as indicated at 59, to engage the end head 20 and the adjacent inner face of the drum 17. With the chutes 51 and 52 radial plates 60 are provided each of which is secured to the inner edges of the corresponding plates 56, 57 and 58 and is also welded to the adjacent inner surface of the drum 17 so as to form a bucket which lifts the material from the space inside of the drum 17 beyond the trailing helix of the screw and discharges the material into the chute formed by the plates 56, 57 and 58 when the bucket assumes the elevated position of the bucket 53, Fig. 1, the inclination of this chute in this position discharging this material into the rotary screen 54, as shown. The bucket 53 is arranged at the trailing end 50 of the screw 19 and hence with this bucket the plate 60 is eliminated, the trailing end of the screw being substituted for these plates.

It will be noted that the plates 60 of each of the buckets 51 and 52 are in the same transverse vertical plane as the trailing edge 50 of the screw 19. Since the final helix of the screw 19 is spaced a greater distance from the plate 60 of the bucket 51 than the plate 60 of the bucket 52, it will be seen that the bucket 51 picks up only a part of the material between the final helix of the screw 19 and the end head 20 of the drum. As the next bucket 52 rotates to the bottom of the drum 19 it will pick up an additional amount of the material trapped between the final helix of the drum 19 and the end head 20. Since the trailing end 50 of the screw forms a part of the bucket 53, it will be seen that the remainder of such trapped material will be picked up and discharged by this bucket 53. Therefore each batch of material conveyed beyond the final helix of the screw 19 is picked up and discharged into the screen 54 in three separate batches, this avoiding injury to tender materials during a transfer to the rotary screen and also providing a moderate uniform feeding of material to the rotary screen.

The screen 54 rotates with the drum 17 and for this purpose is secured to the end of the circular casting 22 by a ring 65, or in any other suitable manner. The screen 54 carries at its opposite discharge end a sheet metal head 66 of frusto conical form to provide an opening 67 of reduced diameter through which the blanched materials are discharged from the apparatus.

The rotary screen 54 carries an internal helical flight 70 which conveys the blanched materials axially of the screen and discharges these materials through the opening 67. The water discharged by the buckets 51, 52 and 53 passes through the rotary screen 54 into a separate discharge basin 71 arranged in and extending transversely the full width of the extension 13, 14 of the tank 10, as best shown in Fig. 5. This discharge basin has a waste outlet 72 connected with an adjustable overflow pipe 73, this adjustable overflow pipe being capable of being swung to any angle so as to discharge all or any desired proportion of the spent water caught by the basin 71. One wall of the basin is formed to provide an adjustable overflow dam having for this purpose a plate 74 which can be adjusted vertically to any desired position. It will be seen that upon adjusting the overflow pipe 73 and the overflow dam 74 any desired proportion of the spent water caught by the basin 71 can be returned to mix with the fresh water from the inlet 35 for reuse in the blanching process.

If desired the blanched drained materials can be washed by water or other wash liquid before being discharged through the opening 67 in the discharge end of the rotary screen 54. For this purpose a wash water pipe 75 is provided which extends into the screen 54 through this opening 67 and is drilled to provide downward jets 76 which wash the materials conveyed through the screen 54 after passing beyond the basin 71. To catch any debris washed from the blanched materials by the sprays 76 a removable screen 77 is arranged under the rotary screen 54 below the sprays 76. The wash water draining from the blanched materials is thereby caught by the removable screen 77 which entrains any debris from this water, the water thereafter mixing with the water used for blanching. It will be noted that by this means the blanched materials are cooled before being discharged from the screen 54 and at the same time the wash water is heated by the blanched material before being mixed with the water used during the blanching operation. It will also be noted that the screen 77 can readily be removed and cleaned and that the frusto conical form of the head 67 serves to insure the return of wash water to the screen 77.

The level of the water in the tank 10 can also be adjusted to a maximum amount by an adjustable overflow pipe 78 which is connected to the duct 33 and capable of being swung to any position so as to discharge a greater or less quantity of the water from the tank 10 and maintain a desired level.

The operation of the blancher is as follows:

While in operation the imperforate drum 17 is being rotated on its supporting rolls 15 by the chain drive 24, this also turning the rotary screen 54 and its helical flight 70. The materials to be blanched are fed in a continuous stream to the bar screen 25 which conducts these materials to the lead end of the screw 19. Wash water may be supplied through the pipe 75 and the desired level of the blanching water within the tank 10 is maintained by the float valve 30 supplying fresh water through the inlet 35. Steam is supplied to the steam pipe 40, this steam emerging through the perforations 41 in this pipe, and the dam 74 and adjustable overflow pipe 73 are set to waste any desired proportion of the spent blanching water passing into the basin 71, that proportion of the water not wasted through the overflow pipe 73 passing over the overflow dam 74 and being recirculated.

The water from the fresh water inlet 35, wash sprays 76 and any water overflowing the dam 74 flows through the tank 10 toward the inlet end of the rotary drum 17. In so flowing this water passes the steam pipe 40 and is preheated preparatory to its being used for blanching. The water so flowing through the tank 10 is also agitated by the steam issuing from the perforations 41 and by the rotary movement of the drum 17 so that it is of uniform temperature before being admitted to the inlet end of the drum 17. As the lower part of the screw 19 is immersed in this water, each rotation of the lead end of the screw 19 picks up a batch of the material to be blanched as well as enough preheated water to cover this material. The successive batches picked up by the lead end of the screw are then positively advanced by the screw to the discharge end of the imperforate drum 17, these batches being subjected to the heat of the steam issuing from the steam pipe 40 and being blanched. By providing a screw conveyer, as shown, the material to be blanched is positively controlled, this being effected by adjusting the speed of rotation of the drum 17, and hence it will be seen that a definite blanching time is provided. It will further be seen that by blanching in separate batches the danger of contamination is reduced and is entirely eliminated if all of the spent blanching water received in the basin 71 is wasted. As each batch passes beyond the final helix of the screw 19 a part of this batch is picked up by the bucket 51 and when this bucket reaches the top of the drum the material so picked up is discharged through its inclined chute 56, 57, 58 into the rotary screen 54. The bucket 52 then similarly picks up another part of the batch delivered by the screw 19 to the discharge end of the drum 17 and the remainder of this batch is similarly picked up and discharged into the screen 54 by the third bucket 53.

The water from the material so discharged onto the rotary screen by the buckets 51, 52 and 53 passes through the rotary screen 54 into the basin 71 from which all of this spent water can be wasted through the adjustable overflow pipe 73. If it is desired to reuse any proportion of this spent water, the adjustable overflow pipe 73 and dam 74 are adjusted so that a part of this spent water is returned to the tank 10. The blanched materials retained upon the rotary screen 54 are picked up by the helical flight 70 and conducted lengthwise toward the discharge opening 67. This blanched material is then subjected to the washing action of the sprays 76, these sprays serving to cool the blanched materials and at the same time the spray water being heated by the blanched materials. This spray water, together with any debris washed from the blanched materials, flows onto the removable screen 71 which catches any debris, the wash water joining the fresh and recirculated water supplied to the tank 10 and being used for blanching purposes. It will also be noted that the form of the head 66 insures the draining of the blanched material and the return of substantially all the wash water to the removable screen 71 which can be easily removed for the purpose of cleaning the same.

With the blancher as shown access can readily be had to all parts by removal of the hood 42 which serves to prevent the escape of vapor except through the vent 45. It will also be seen that the screw 19 is self-cleaning but that if desired a person can enter the drum 17 for the purpose of cleaning or repairing the screw and the interior of the drum. It will also be noted that the level of the blanching water in the tank 10 can be adjusted so that it will just cover the material to be blanched, thus rendering the blancher economical in the use of water and steam. This also makes it possible in many instances to use the blanching water only once, as a minimum amount of such water is employed. Where a part of the water is recirculated it will be noticed that this water is positively circulated because of the pumping action of the screw 19 in the imperforate drum 17.

By "imperforate helix," as used in the accompanying claims is meant a helix which is imperforate in that portion which is effective, namely, that portion which becomes immersed in the water conveyed by the helix, it being obviously immaterial whether or not this helix is provided with perforations beyond its effective area.

From the foregoing it will be seen that the invention provides a blancher which can be easily kept in a clean and sanitary condition; which is economical in the use of water and steam; in which there is a positive control of the material passing through the blancher; in which improved color and flavor of the product blanched can be obtained; in which absolute control of the blanching water used or reused is obtained; in which provision is made for draining the blanched materials and rinsing the same; in which the blancher is of sturdy construction throughout and in which the intakes are arranged at a low level and the overflow discharge arranged at a convenient height.

It will be understood that the invention relates essentially to the apparatus and hence the invention is not limited to the use of water, it being entirely within the scope of my invention to use any other suitable treating liquid.

I claim as my invention:

1. An apparatus for treating foodstuffs, comprising a tank, an open ended imperforate drum arranged in said tank and rotatable about a substantially horizontal axis, an imperforate helix secured to the inside of said drum to provide a liquid tight channel extending circumferentially and lengthwise of said drum and having a portion of its lower part arranged below the level of the liquid contained in said tank, said drum being spaced from said tank to provide a longitudinal channel in the bottom of said tank for conducting said liquid lengthwise of said drum and exteriorly thereof, means for rotating said drum and helix about said axis, means for feeding the foodstuffs to be treated to the leading end of said helix, said helix thereby picking up successive batches of predetermined amounts of liquid from said tank and confining and conveying said liquid and the foodstuffs so fed in batches which are completely independent and separate from one another and said batches being arranged between the convolutions of said helix and conveyed to the discharge end of said drum, means at the discharge end of said helix for separating the treated foodstuffs and liquid from each other, means for returning a part of the separated liquid to said tank, means for heating the liquid flowing in said tank under said drum from said returning means to the inlet end of said helix and means connecting with the flow of said liquid from said returning means to said heating means for admitting fresh liquid to said tank.

2. An apparatus for treating foodstuffs, comprising a tank, an open ended imperforate drum rotatable about a substantially horizontal axis, an imperforate helix secured to the inside of said drum to provide a liquid tight helical channel extending circumferentially and lengthwise of said drum and having a portion of its lower part arranged below the level of the liquid contained in said tank, means for rotating said drum and helix about said axis, means for feeding the foodstuffs to be treated to the leading end of said helix, said helix thereby confining and conveying the liquid and the foodstuffs so fed in batches which are completely independent and separate from one another, said batches being arranged between the convolutions of said helix and conveyed to the discharge end of said drum, means at the discharge end of said helix for separating the treated foodstuffs and liquid from each other and returning a part of said separated liquid to said tank and heating means immersed in the liquid in said tank and arranged under said drum and helix thereby to heat the batches conveyed by said helix and to preheat the liquid in said tank.

3. An apparatus for treating foodstuffs, comprising an open ended drum rotatable about a substantially horizontal axis, a helix secured to the inside of said drum and providing a screw conveyer, means for rotating said drum and helix, means for feeding the foodstuffs to be treated and liquid to the leading end of said helix, said helix thereby conveying the foodstuffs and liquid so fed in separate batches between its convolutions to the discharge end of said drum, means for heating the batches so conveyed by said helix, a cylindrical screen secured to the discharge end of said drum, said screen being arranged coaxially of said drum and being of smaller diameter than said drum, a bucket carried by said drum beyond the trailing convolution of said helix for discharging the treated foodstuffs and liquid from said drum into said cylindrical screen, a helical flight in said screen for conducting the treated foodstuffs axially toward its discharge end, means at the discharge end of said screen for washing the treated foodstuffs conveyed by said helical flight, a removable screen arranged under said cylindrical screen in the path of said wash liquid to entrain any debris carried thereby and means for admitting the wash liquid screened by said removable screen to the liquid fed to the leading end of said helix.

4. An apparatus for treating foodstuffs, comprising a tank, a helix rotatable about a substantially horizontal axis and having its lower part immersed in liquid contained in said tank, means for feeding the foodstuffs to be treated to the leading end of said helix, means for confining the foodstuffs so fed and liquid in separate batches between the convolutions of said helix, means for heating the batches of foodstuffs conveyed by said helix, a screen at the trailing end of said helix onto which the batches of liquid and treated foodstuffs are deposited by said batch conveyer, a basin arranged under said screen and receiving the liquid separated from said treated foodstuffs, an adjustable overflow for said basin for conducting waste liquid from said basin and an adjustable overflow dam for said basin for conducting liquid from said basin to said tank, the relative adjustment of said overflows thereby permitting of adjustment of the relative amounts of recirculated liquid used in treating.

5. An apparatus for treating foodstuffs, comprising means providing a treating chamber, a batch conveyer traversing said treating chamber, means at one end of said treating chamber for feeding liquid and the foodstuffs to be treated to said batch conveyer, a screen at the opposite end of said treating chamber onto which the batches of liquid and treated foodstuffs are deposited by said batch conveyer, a basin arranged under said screen and receiving the liquid separated from said treated materials, two adjustable overflows for said basin, the liquid from one of said overflows being discharged and the liquid from the other of said overflows being admitted to the liquid supplied to said batch conveyer, the relative adjustment of the said two overflows thereby permitting of adjustment of the amount of recirculated liquid used in the treating.

WILLIAM DE_BACK.